April 23, 1929.   H. MAAS   1,710,368
PAN HOLDER AND RETAINER
Filed Sept. 12, 1924
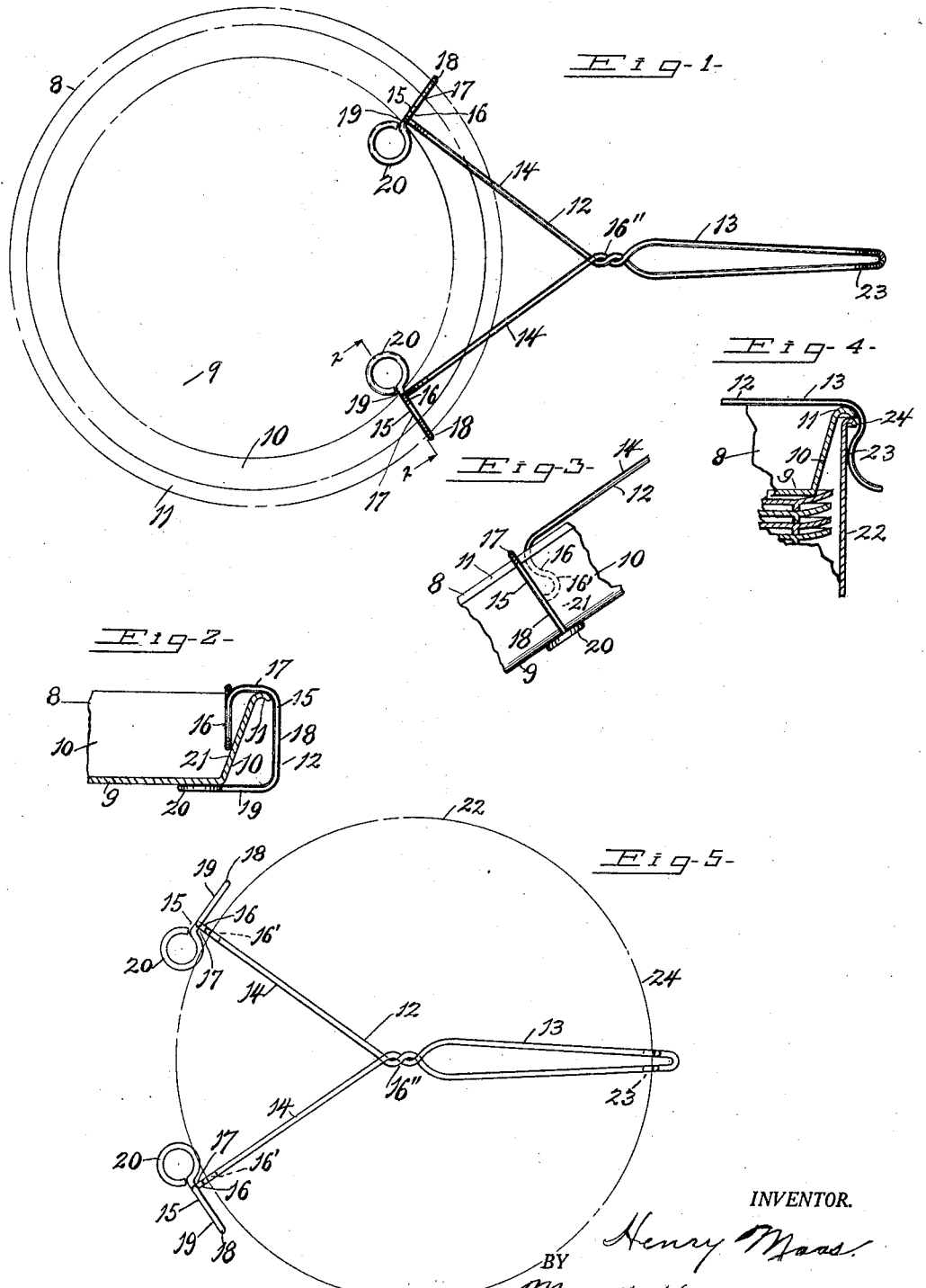
INVENTOR.
Henry Maas.
BY
Morsell, Keeney & Morsell,
ATTORNEYS.

Patented Apr. 23, 1929.

1,710,368

UNITED STATES PATENT OFFICE.

HENRY MAAS, OF SHEBOYGAN, WISCONSIN, ASSIGNOR TO THE VOLLRATH CO., OF SHEBOYGAN, WISCONSIN, A CORPORATION OF WISCONSIN.

PAN HOLDER AND RETAINER.

Application filed September 12, 1924. Serial No. 737,346.

This invention relates to improvements in pan holders and retainers.

It is the common practice in outing utensils to provide sets of dishes including frying pans, which may be closely packed together, but considerable space is usually required to accommodate the frying pan and its handle, and it is one of the objects of this invention to provide a pan holder and retainer in which the holder may be removably connected to a pan or dish to serve as a handle, and when not in use as a handle, it may be connected to the upper edge portion of a pail or bucket adapted for holding outing dishes, including the pan, to retain said utensils in the receptacle.

A further object of the invention is to provide a pan holder and retainer which may be snapped over the edge of a pan to serve as a handle, and which will, when connected firmly, engage and hold the pan.

A further object of the invention is to provide a pan holder and retainer in which the pan of the outing set of utensils may be used as the cover for the pail holding all of the remaining dishes, and the holder placed on the upper edge of the pail to hold the cover in place.

A further object of the invention is to provide a pan holder and retainer which is of simple construction, is strong and durable, and is well adapted for the purpose described.

With the above and other objects in view the invention consists of the improved pan holder and retainer and its parts and combinations as set forth in the claims, and all equivalents thereof.

In the accompanying drawing in which the same reference characters indicate the same parts in all of the views:

Fig. 1 is a top view of the improved pan holder and retainer shown connected to a pan, the pan being indicated by dotted lines;

Fig. 2 is a transverse sectional detail view thereof taken on line 2—2 of Fig. 1;

Fig. 3 is a detail side view of the parts shown in Fig. 2;

Fig. 4 is a detail side view of the outer end portion of the holder and retainer shown in engagement with the pail and the pan when the pan is used as a cover; and Fig. 5 is a top view of the holder and retainer shown mounted on the upper edge portion of a pail adpated to contain a set of dishes and the pan, the pail being indicated by dotted lines.

Referring to the drawing the numeral 8 indicates an enameled steel pan of ordinary construction which is provided with a bottom portion 9, an angularly extending side portion 10 and a rounded edge or rim 11. The improved holder and retainer 12 is formed of a length of spring wire bent and twisted to form the handle portion 13, diverging arm portions 14 and holder portions 15. The handle portion is formed by folding the wire medially of its length and then twisting intermediate parts 16'' together as shown in Figs. 1 and 5. From the point of twist the wire diverges to form the arms 14 and at their outer ends the wire is curved downwardly and then bent upwardly to form return bends 16 which extend over the rim of the pan and engage the inner surface of the side portions of the pan. From said bends the wire parts are bent radially outwardly as at 17 to extend over the rim 11, and the wire parts are then bent downwardly as at 18 the distance corresponding to the height of the pan, and then bent inwardly to extend beneath the pan as at 19 and terminate with eyes 20 to provide firm supports beneath the pan. As thus shaped the angular parts 16, 17, 18 and 19 form the holding portions 15, before mentioned, and which portions provide entrance spaces 21 to permit the entrance of the side portions of the pan to holding position. The construction also permits the easy disengagement of the holder with the pan.

To engage the pan it is only necessary to insert the rim portion of the pan through the entrance spaces and then force the handle downwardly to snap the holding portions 19 beneath the pan as the spring of the wire will permit the parts to give. In removing the holder the handle is pushed upwardly to spring the parts 19 from beneath the pan and the holder may then be easily removed from the pan. The outing utensils are usually nested and in the present case are placed in a pail 22 and the pan 9 is of a size to form a cover for the pail as indicated in Fig. 4. To retain the cover in place the outer or handle end of the holder is curved downwardly inwardly and then outwardly to form inner shoulders 23 which are adapted to snap over the annular bead or shoulder 24 of the pail 22 while the handle portions of the holder bear upon the upper edge of the pan. The curved shoulder portions 16' of the holder are also adapted to snap over the bead or shoulder 24 of the pail while the arms 14 bear against the upper edge of the pan 9 and securely retain the cover in closed position and the other dishes in the pail.

From the foregoing description it will be seen that the pan holder and retainer is of simple construction and is well adapted to the double function of a holder for a pan and a retainer for holding the pan on a pail as a cover.

What I claim as my invention is:

1. A pan holder and retainer, comprising a member formed of spring wire bent and twisted to provide a handle portion and diverging arms from the point of twist, the outer end portions of said arms being bent downwardly and upwardly with return bends to form receptacle engaging shoulder and parts engageable with the inner side portions of a pan, the end portions of the wire being bent outwardly and then downwardly and then inwardly to form pan supporting parts to extend beneath the bottom of a pan, said supporting parts being spaced from the return bends to provide spaces permitting the insertion of the edge portions of the pan therethrough, the opposite end of the handle part being bent downwardly in curved formation to form receptacle engaging shoulders.

2. A pan holder and retainer, comprising a member shaped of wire formed to provide a handle portion and spaced arms having downwardly and upwardly bent end portions and return bends to form receptacle engaging shoulders and parts engageable with the inner side portions of a pan, the end portions of the wire being bent outwardly and then downwardly and then inwardly to form pan supporting parts to extend beneath the bottom of a pan, said supporting parts being spaced from the return bends to provide spaces permitting the insertion of the edge portions of the pan therethrough, the opposite end of the handle being bent downwardly to form receptacle engaging shoulders.

3. A pan holder and retainer, comprising a member formed of wire bent to provide a handle portion and spaced arms having downwardly and upwardly bent portions for holding pans and also forming receptacle engaging shoulders, the handle also being bent downwardly to form shoulders which coact with the shoulders of the arms in engaging a receptacle.

In testimony whereof, I affix my signature.

HENRY MAAS.